United States Patent
Eberlein et al.

(10) Patent No.: US 12,216,624 B2
(45) Date of Patent: Feb. 4, 2025

(54) SCHEMA STACK MANAGEMENT SYSTEM FOR MANAGING EXTENSIONS THROUGH UPGRADES

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 128 days.

(21) Appl. No.: 17/938,101

(22) Filed: Oct. 5, 2022

(65) Prior Publication Data

US 2024/0119033 A1    Apr. 11, 2024

(51) Int. Cl.
| | | |
|---|---|---|
| *G06F 16/21* | (2019.01) | |
| *G06F 8/65* | (2018.01) | |
| *G06F 16/25* | (2019.01) | |

(52) U.S. Cl.
CPC .............. *G06F 16/213* (2019.01); *G06F 8/65* (2013.01); *G06F 16/256* (2019.01)

(58) Field of Classification Search
None
See application file for complete search history.

(56) References Cited

U.S. PATENT DOCUMENTS

| | | | |
|---|---|---|---|
| 8,805,971 B1 * | 8/2014 | Roth | G06F 9/5072 709/220 |
| 10,303,665 B2 | 5/2019 | Engelko et al. | |
| 2002/0065879 A1 | 5/2002 | Ambrose et al. | |
| 2016/0085777 A1 | 3/2016 | Engelko et al. | |
| 2016/0246832 A1 | 8/2016 | Eberlein et al. | |
| 2020/0159852 A1 | 5/2020 | Meissner et al. | |
| 2022/0171748 A1 * | 6/2022 | Bamel | G06F 11/1464 |
| 2023/0236849 A1 * | 7/2023 | Kumar | G06F 8/76 715/762 |

FOREIGN PATENT DOCUMENTS

EP    3321823    5/2018

OTHER PUBLICATIONS

Extended European Search Report in European Appln. No. 22207376.9, mailed on Aug. 25, 2023, 9 pages.
Sap.com "SAP Data Warehouse Cloud" Aug. 16, 2022, retrieved on Oct. 4, 2022, retrieved from URL <https://www.sap.com/products/technology-platform/data-warehouse-cloud.html?campaigncode=crm-ya22-int-1517065&source=ppc-1na-bing-search-71700000093329964-58700007780852008-btp_btp-x-x-x&dfa=1&gclid=93b78ee4347ela580d37ec97beb2bd88&gclsrc=3p.ds&>, 6 pages.

* cited by examiner

*Primary Examiner* — Giuseppi Giuliani
(74) *Attorney, Agent, or Firm* — Fish & Richardson P.C.

(57) ABSTRACT

Implementations include a schema stack management system that enables zero-downtime during execution of maintenance procedures on application systems having schema stacks including one or more customer-provided schema extensions.

20 Claims, 14 Drawing Sheets

SCHEMA STACK MANAGEMENT SYSTEM FOR MANAGING EXTENSIONS THROUGH UPGRADES

BACKGROUND

Entities, such as software developers and/or vendors, provide software and services. Example software can include enterprise software. In some examples, enterprise software can include application software (an application) that interacts with one or more databases. For example, an application can be hosted on one or more application servers and a user can interact with the application using a client device. In some examples, user interaction can result in data being read from, written to, and/or modified within one or more databases provided in one or more database systems. Providers of enterprise software can provision a base configuration that can be used by multiple customers. In some instances, individual customers are able to modify the base configuration to provide a custom configuration using one or more extensions.

During a lifecycle of the application and/or database, one or more maintenance operations may be required. Example maintenance operations include upgrading, patching and testing. In order to perform such maintenance procedures, the application and/or database may be taken offline, such that users are unable to interact with the application and/or database. However, in instances where a customer has implemented a custom configuration, maintenance operations can disrupt the custom configuration. Managing custom configurations through a maintenance procedure is a complex task that is time- and resource-consuming and requires extended downtime in order to ensure that the custom configuration is operable after the maintenance operation is complete.

SUMMARY

Implementations of the present disclosure are directed to a schema stack management system for managing applications in database systems. More particularly, implementations of the present disclosure are directed to a schema stack management system that enables zero-downtime during upgrade of applications in the presence of extensions.

In some implementations, actions include providing, for production use, an application system including a schema stack having a first cross schema and one or more extension schemas, initiating a maintenance procedure to the application system, during the maintenance procedure, maintaining a first set of synonyms between the first cross schema and one or more data spaces having data stored therein to enable continued production use of the schema stack while the maintenance procedure executes, deploying a second cross schema in the schema stack, the second cross schema being a different version than the first cross schema, providing a second set of synonyms between the second cross schema and the one or more data spaces to enable non-production use of the second cross schema while the maintenance procedure executes, and in response to determining that the schema stack includes one or more extension schemas executing one or more of providing at least one connection between a first extension schema and the second cross schema, and deploying a second extension schema, and after completion of the maintenance procedure, selectively transitioning the first cross schema from production use to non-production use and the second cross schema from non-production use to production use for one or more users. Other implementations of this aspect include corresponding systems, apparatus, and computer programs, configured to perform the actions of the methods, encoded on computer storage devices.

These and other implementations can each optionally include one or more of the following features: the first extension schema is included in the schema stack prior to execution of the maintenance procedure and is available for production use through the first cross schema for production use while the maintenance procedure executes, the at least one connection between the first extension schema and the second cross schema being provided for non-production use while the maintenance procedure executes; selectively transitioning the second cross schema from non-production use to production use at least partially includes enabling the at least one connection between the first extension schema and the second cross schema for production use; the second extension schema is a different version of the first extension schema and replaces the first extension schema for production use upon transitioning the second cross schema from non-production use to production use; the first extension schema is created and deployed by a consumer of the application system, and in response to execution of the maintenance procedure, the consumer is alerted and provides the second extension schema to replace the first extension schema for production use; selectively transitioning the first cross schema from production use to non-production use and the second cross schema from non-production use to production use for one or more users at least partially includes transitioning at least one user from a first user interface to a second user interface; and the maintenance procedure is executed by a vendor of the application system.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to a schema stack management system for managing applications in database systems. More particularly, implementations of the present disclosure are directed to a schema stack management system that enables zero-downtime during upgrade of applications in the presence of extensions.

Implementations can include actions of providing, for production use, an application system including a schema stack having a first cross schema and one or more extension schemas, initiating a maintenance procedure to the application system, during the maintenance procedure, maintaining a first set of synonyms between the first cross schema and one or more data spaces having data stored therein to enable continued production use of the schema stack while the maintenance procedure executes, deploying a second cross schema in the schema stack, the second cross schema being a different version than the first cross schema, providing a second set of synonyms between the second cross schema and the one or more data spaces to enable non-production use of the second cross schema while the maintenance procedure executes, and in response to determining that the schema stack includes one or more extension schemas executing one or more of providing at least one connection between a first extension schema and the second cross schema, and deploying a second extension schema, and after completion of the maintenance procedure, selectively transitioning the first cross schema from production use to non-production use and the second cross schema from non-production use to production use for one or more users.

Figure 1:
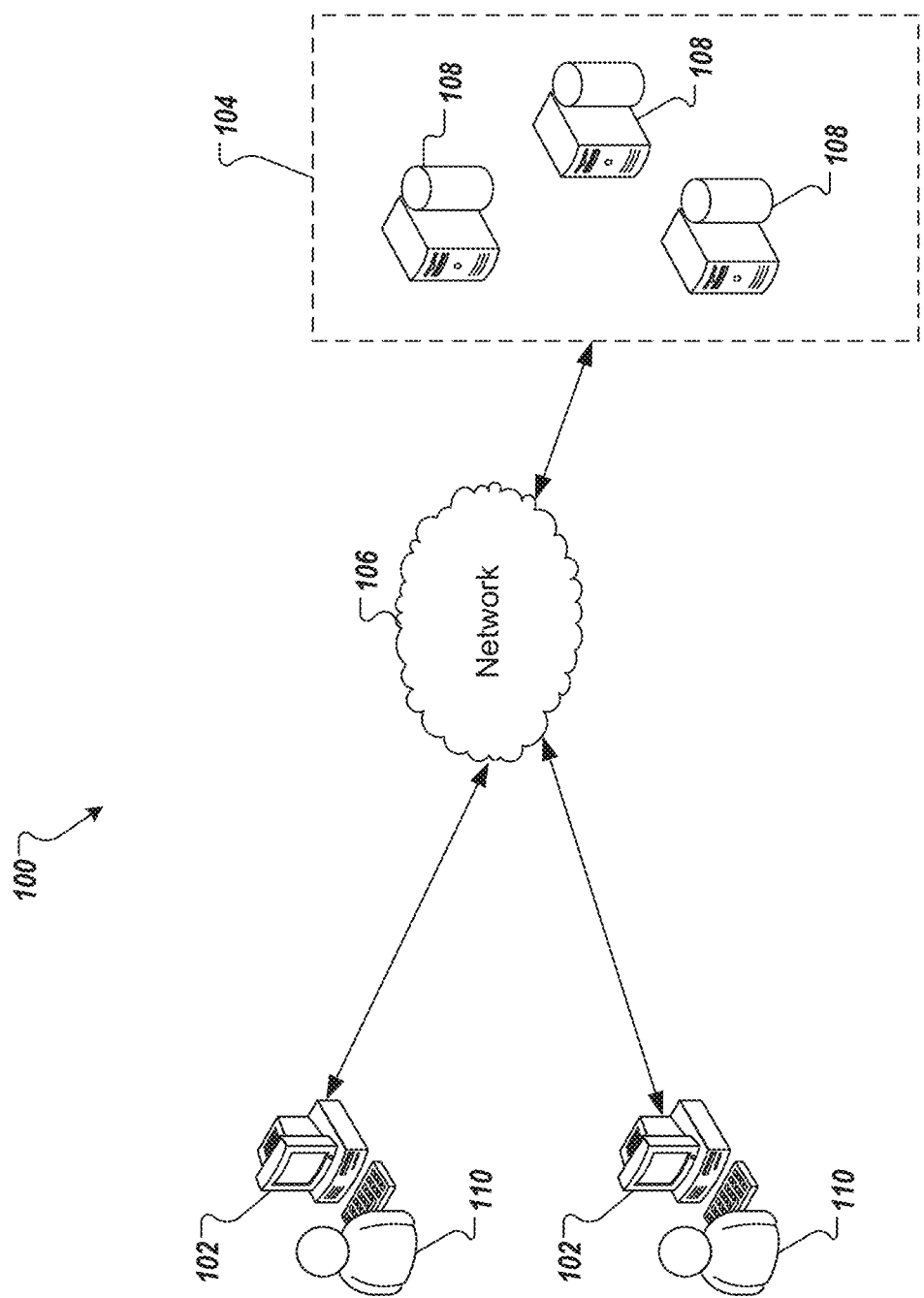
FIG. 1 depicts an example architecture that can be used to execute implementations of the present disclosure.

FIG. 1 depicts an example architecture 100 in accordance with implementations of the present disclosure. In the depicted example, the example architecture 100 includes one or more client devices 102, a server system 104 and a network 106. The server system 104 includes one or more server devices 108. In the depicted example, respective users 110 interact with the client devices 102. In an example context, a user 108 can include a user, who interacts with an application that is hosted by the server system 104. In another example context, a user 108 can include a user, who interacts with the server system 104 to perform one or more maintenance procedures, described in further detail herein.

In some examples, the client devices 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices, e.g., the client devices 102, over the network 106.

In some implementations, one or more data stores of the server system 104 store one or more databases. In some examples, a database can be provided as an in-memory database. In some examples, an in-memory database is a database management system that uses main memory for data storage. In some examples, main memory includes random access memory (RAM) that communicates with one or more processors, e.g., central processing units (CPUs), over a memory bus. An-memory database can be contrasted with database management systems that employ a disk storage mechanism. In some examples, in-memory databases are faster than disk storage databases, because internal optimization algorithms can be simpler and execute fewer CPU instructions, e.g., require reduced CPU consumption. In some examples, accessing data in an in-memory database eliminates seek time when querying the data, which provides faster and more predictable performance than disk-storage databases.

Implementations of the present disclosure are described in further detail herein with reference to an example context. The example context includes applications that are executed on a client-server architecture, such as the example architecture 100 of FIG. 1. In some examples, applications can be provided in a suite that includes two or more applications. Example applications can include an enterprise resource planning (ERP) application, a customer relationship management (CRM) application, a supply chain management (SCM) application, and a product lifecycle management (PLM) application. It is contemplated, however, that implementations of the present disclosure can be realized in any appropriate context (e.g., healthcare applications).

Referring again to FIG. 1, and in the example context, one or more applications can be hosted by the server system 104. A user 110 can interact with an application using the client device 102. More specifically, a session can be established between the client device 102 and one or more server devices 104, during which session the user 110 is able to interact with one or more applications hosted on the server system 104. The one or more applications can enable the user to interact with data stored in one or more databases. In some examples, interactions can result in data being stored to the database, deleted from the database, and/or edited within the database.

In some instances, providers of enterprise software can provision an application in a base configuration that can be used by multiple customers. In some instances, individual customers are able to modify the base configuration to provide a custom configuration using one or more extensions, as described in further detail herein. During a lifecycle of the application one or more maintenance operations may be required. Example maintenance operations include upgrading, patching, and testing. For example, and without limitation, an enterprise software provider can upgrade the application to add, remove, and/or modify one or more features. However, in instances where a customer has implemented a custom configuration, the upgrade can disrupt the custom configuration. For example, the upgrade may result in an extension no longer being compatible with the application. Managing custom configurations through the upgrade is a complex task that is time- and resource-consuming and requires extended downtime in order to ensure that the custom configuration is operable after the maintenance operation is complete. During downtime, the application is taken offline, such that users are unable to interact with the application.

In view of the above context, implementations of the present disclosure provide a schema stack management system that enables customizations (e.g., custom configurations) through extensions at the database level. In some implementations, the customizations can be integrated during production use without requiring downtime. In some implementations, the customizations are unaffected by maintenance procedures. That is, the customizations can be used immediately following execution of maintenance procedures without modification to the extensions. As described in further detail herein, implementations of the present disclosure enable maintenance procedures, such as an upgrade, to be performed in a time- and resource-efficient manner without disruption to custom configurations that had been implemented prior to execution of maintenance procedures. Further, implementations of the present disclosure eliminate or minimize any downtime required for execution of maintenance procedures and/or integration of customizations.

Implementations of the present disclosure are described in further detail with non-limiting reference to example use cases. It is contemplated, however, that implementations of the present disclosure can be implemented in any appropriate use case. Further, implementations of the present disclosure are described in further detail herein with reference to example product offerings of SAP SE or Walldorf, Germany, an example provider of enterprise software and database systems. It is contemplated, however, that implementations of the present disclosure can be implemented with any appropriate product offerings or any provider of enterprise software and/or database systems.

In an example use case, federated analytics applications can process data replicated from distributed applications with respective databases (e.g., customer-specific databases). In some examples, selected data is replicated from each connected application to a central database, where database mechanisms (e.g., union, join) are used to create federated views on data spanning multiple applications. For example, data from a first application (A1) and data from a second application (A2) can be retrieved from respective data spaces (e.g., in the same or different databases) and the data can be combined in a view (also referred to as federated view) using union and/or join operations. In some examples, a union operation combines data from multiple tables into distinct rows. For example, if two tables are unioned, data from the first table is in one set of rows and data from the second table in another set of rows. That is, a union changes the content, but not a structure. In some examples, a join operation combines data from multiple tables into new columns. For example, if two tables are joined, data from the first table is shown in one set of columns adjacent to the column of the second table in the same row. That is, the join operation can change a structure by adding columns, for example. Functionality, such as that introduced above in the example use case, is provided with SAP Data Warehouse Cloud provided by SAP SE of Walldorf, Germany. SAP Data Warehouse Cloud can be described as going beyond traditional data warehousing to provide a multi-cloud, multi-source semantic service for enterprise analytics and planning.

With further reference to the example use case, each customer (e.g., an enterprise that uses the application(s) and database system) is provided its own database and/or tenant space within a database to host replicated data. For each customer, data is replicated from a customer system. In some examples, views can be deployed to provide analytics transformations on the data, which can be displayed to agents of customers (e.g., employees) in a user interface (UI). Example analytics can include, for example and without limitation, insights that are determined from the data using, for example, statistical analysis.

With non-limiting reference to an example database system, data of a SAP S/4HANA system can be federated with SAP SuccessFactors and SAP Ariba to run cross-domain analytics spanning these multiple applications. These applications run as individual software-as-a-service (SaaS) or on-premise applications, which are integrated from an enterprise perspective (e.g., common domain model on shared data). In some examples, SAP Data Warehouse Cloud enables the creation and use of federated data sets that combine data of the respective applications.

In further detail, applications A1, . . . , An can be connected to a federated analytics tenant (FAT). For each application, a so-called landing space is created, which can be deployed to the FAT to host replicated data from the application, and to provide join/union/projection views and create views for consumption by federated analytics modules. In some examples, so-called cross modules can be created, which operate on a set of applications. In this manner, a relatively large set of customers can be supported with heterogeneous consumption of applications (e.g., some customers use applications A1-A6, other customers use application A3-A10, still other customers use applications A1, A4, and A6). For each customer, landing spaces and cross modules that the customer needs can be determined and can be used for the set of applications the customer uses.

In such applications, customers are offered customization using extensibility mechanisms to create custom spaces with replicated data, custom database views, and/or extending pre-provided views to implement custom needs. This can include data based on extensions in the connected application (e.g., S/4HANA, SuccessFactors), but also custom unions, joins, and/or aggregation views.

In parallel with applications provided by the application vendor, customers can create custom content. However, this can cause additional complexity. For example, if an application vendor pushes maintenance into a tenant, the applications are regularly updated to new versions (e.g., using continuous integration (CI) and/or continuous delivery (CD) paradigms). Such deployments can occur frequently and need to be free of disruption (e.g., no downtime, minimal downtime).

Further, developers of a customer need a stable environment to develop their extensions without frequent need to react to vendor maintenance or experience downtime. When developers of a customer release a new version of an extension, the extension needs to be integrated in the vendor application and replace the earlier version of the extension, also without disruption for the consumers or downtime. In some examples, developers need a "sandbox" space where they can perform their development in an isolated area only visible to the individual developer. In this manner, the developers can iterate over their changes until the changes are ready for production use. When the changes are ready, developers want to release the changes that need to be integrated in the common stack, removing developer individual hooks and access channels.

Customers with relatively large organizations have multiple development teams that require separate development spaces for their changes that are integrated with both the vendor content and the content of other teams. This further increases the complexity of the development interdependencies.

For development of extensions, flexible deployment and "IP safe" extensibility (i.e., extensions that do not expose the details of vendor analytical code) a namespace concept is used. Here, each application provided by a vendor, a partner, or a customer has a respective namespace. At runtime, each customer team (developers) creating extensions to the applications have their own namespaces separated from the vendor. In this manner, development of the different applications and extensions is decoupled, deployment is flexible, and deployment techniques, such as blue-green deployment, are possible. At deploy time to a database system, the namespace is mapped to a construct in the database providing a namespace.

A customer tenant can be described as a customer (e.g., an enterprise) that consumes multiple applications in a tenant of the database and that can create its own applications and/or extend pre-provided applications. In some examples, for each customer tenant, a set of database schemas is created at deploy time, and additional schemas are created for extensibility. When applications have dependencies (e.g., use objects of other applications), the objects created will reference objects in another schema. In this manner, a customer tenant is provided with a set of schemas with dependencies therebetween, which can be referred to as a schema stack.

In some implementations, dependencies between applications, schemas, and data spaces are defined during a design-time, prior to deployment to a production environment. More particularly, each application is assigned a respective, unique namespace (e.g., app-space-name) to create objects. Technically, upon deployment to a database system, a database schema is used as a namespace. In some examples, for the application namespace (app-space-name), a schema is created (e.g., schema-id). In some examples, applications only define views with references to objects within their own namespace. If objects of other applications are used, the objects are defined as being imported (e.g., importing <app-space-name>.<object-name>). If objects from an application are to be accessible for other applications, the objects are defined as exporting (e.g., exporting <object-name> [to <app-space-name>]). Objects not defined as exporting within an application cannot be accessed by other applications using importing. In some examples, UIs (e.g., consumers outside of the database system) can also only use objects defined by application with exporting.

Upon deployment to a database system, a synonym is created in the schema <consuming-schema-id> of the importing application for the object in schema <providing-schema-id> of the exporting application. In some examples, a synonym can be described as a pointer or a symbolic link to a view or table. For example, a query statement can be executed to select from a synonym, as would be selected from the view or table that the synonym points to. Here, the synonym would be read by, for example, a "prepare query statement" process within the database system. In some examples, a data definition language (DDL) statements can be used when creating a view. A synonym can be used in the definition of the view to select data from, as would be done using a view or a table. The synonyms are computed out of the "exporting/importing" statements defined by the developer. In some examples, synonyms can be created using the following create command and format:

```
create synonym <consuming-schema-id>.<object-name> for
  <providing-schema-id>.<object-name>
```

In accordance with implementations of the present disclosure, and as described in further detail herein, if an imported object of an application is replaced through use of an extension, the extension needs to be deployed and the synonym is created to the deployed extension objects in the extension schema instead of the object in the (original, non-customized) application.

In some implementations, upon deployment, all applications specified as importing <app-space-name> are deployed. This is recursive until the required applications are complete and all importing statements of all applications in the stack are fulfilled. Thus, a consistent application stack is deployed with no un-resolved dependencies existing.

In view of the exporting/importing relationships, dependencies are defined, which can be represented in an application dependency graph. In some examples, a dependency registry can be provided that stores the dependencies upon deployment. By way of non-limiting example and for purposes of illustration, applications B1, B2 can each require objects from an application A1, and the application A1 can require data read from a table (TABX) of an application E1. For this example, an example dependency registry can be provided as:

TABLE 1

Example Dependency Registry

| Application | Version | Depends On | Min. Version |
|---|---|---|---|
| B1 | 1.1 | A1 | 2.0 |
| B2 | 2.3 | A1 | 3.0 |
| A1 | 3.1 | E1_DATA | 2.0 |

In the example of Table 1, the registry is version-specific (e.g., B1 version 1.1. uses A1 minimum version 2.0, B2 version 2.3 uses A1 minimum version 3.0, A1 version 3.1 uses E1_DATA minimum version 2.0).

If an exported object is changed with a new version, dependent applications may be required with a new version as well (e.g., if the change is incompatible). For decoupled maintenance of the different applications and extensions, exported objects need to be changed only compatibly. If an object is changed incompatibly, dependent applications are required to be deployed in the same process with an appropriate version.

For example, and continuing with the non-limiting example, an extension Ext E1 can be used as a customization, such that a view of the application A1 imports an object of the extension Ext E1, which imports an object from the application E1. In this manner, data provided through the view of the application A1 is different than it would have been without the extension Ext E1. That is, the extension Ext E1 provides a customization of the application A1 without requiring re-coding/code modification to the application A1, which remains as originally programmed. For this example, an example dependency registry can be provided as:

TABLE 2

Example Dependency Registry

| Application | Version | Depends On | Min. Version |
|---|---|---|---|
| B1 | 1.1 | A1 | 2.0 |
| B2 | 2.3 | A1 | 3.0 |
| A1 | 3.1 | Ext E1 | 1.0 |
| Ext E1 | 1.0 | E1_DATA | 2.0 |

Upon deployment to the production environment, dependencies in the dependency registry are used to provide synonyms that connect (wire) import/export paths between applications. Continuing with the example above, create synonym statements can be executed to provide the following example synonyms:

```
synonym B1_#3.B_IF for A1_#12.B_IF
synonym B2_#8.D_IF for A1_#12.D_IF
synonym A1_#12.A_IF for ExtE1.TABX_IF
synonym ExtE1.TABX_IF for E1_DATA.TABX_IF
```

In this example, B1_#3 indicates the schema id of the application B1, B2_#8 indicates the schema id of the application B2, A1_#12 indicates the schema id of the application A1, and B_IF and D_IF indicate respective (exported) views B and D of the application A1.

With regard to extensions, such as Ext E1 referenced above, a developer (e.g., a developer of a consumer) can create an extension application. In the extension application, the developer can specify consumption of objects of other applications (importing <app-space-name>.<object-name>) and/or can specify export objects of the extension (e.g., exporting <object-name>), as introduced above. The developer can also specify replacement of objects of consumed applications (e.g., importing and overriding <app-space-name>.<object-name>). Upon the deployment of the extension application, dependent applications are determined. In some examples, a new instance of each dependent application is deployed, and synonyms are created to the consumed application objects. For consumed objects, where an extension object is available, the synonym is created to the object of the extension schema. Once the extension is released for production used, the extension is deployed to the active stack (i.e., within a production environment) and the UI (potentially extended as well) is deployed and configured to the extension stack. Users are switched to the extension stack and the pre-extension stack is dismantled.

If an application is updated to a new version (e.g., $A_{1new}$) a new schema id is generated, and the dependency registry is updated. The application is deployed to the newly defined schema name (e.g. <schema-id-A_1-new>). Imported objects are created as a synonym as described herein. A set of dependent schemas of the schema of the updated application (e.g., Set_S[consuming schema-ids of $A_{1new}$]) are computed and the respective set of applications (e.g., Set_A [apps consuming $A_{1new}$]) is defined. Deployment checks are performed to determine, for example, whether each of the dependent applications is compatible with the new application, or if a new version of the dependent application is required to be deployed. The process is repeated iteratively for dependent applications until no more applications with a dependent application are found. UIs can be configured to access the newly defined exported objects of the newly deployed versions of the applications. Thus, the UI is configured to access the objects in the respective tenant at the <schema-id>. Users are re-directed to the newly deployed versions. After a previous application version is no longer consumed (e.g., all sessions with a previous version have ended), the previous version is de-commissioned.

However, and as introduced above, upgrades to applications in schema stacks having extensions can create multiple problems. In view of this, the present disclosure provides a zero-downtime upgrade procedure, in which a new version of an application is deployed in parallel to continued production use of a previous version of the application. Once deployment is complete, the new version can be tested in a development environment and, if acceptable, users can be switched to the new version. Because data is written to the tenant only through replication by applications and not by users of the tenant, it is possible to switch users individually from the previous version to the new version. In this manner, users can complete running queries on the previous version and, upon starting a new query, the queries are re-directed to the new version.

For the upgrade procedure, the application(s) that is/are to be upgraded is/are identified. The system computes which space to deploy with a new version in parallel to the current version. If an application is deployed (with the same version or a new version), dependent applications are determined and are deployed as well. For the top-level applications, the UI is potentially upgraded as well and is configured to connect to the newly provided spaces.

In some implementations, the schema stack management system of the present disclosure determines the schema id of the app-space-name to be deployed (a new schema id to avoid collisions with the running version), determines the wiring (synonyms) of the imported objects, and determines whether there are any dependent applications that are not upgraded. For example, and with reference to the examples above, the application A1 can be upgraded to a new version, while the application B1 is not upgraded. That is, the current version of the application B1 will consume objects of the new version of the application A1. In some examples, the new version of the application A1 can come with internal changes (e.g., bug fixes, enhancements), which can be consumed by the application B1, even if the application B1 does not adapt (e.g., the interfaces do not change). This enables a smooth switching of users from the previous combination (e.g., A1v1, B1v1) being deployed and used productively to the new combination (e.g., A1v2, B1v1) being deployed. After deployment of the new combination, the schema stack management system of the present disclosure determines the schema id(s) no longer used and un-deploys (dismantles) these.

Implementations of the present disclosure are described in further detail herein with reference to upgrades in view of example customizations. The example customizations include a union extension and a join extension, each of which is also described through execution of an upgrade procedure.

Figure 2A:
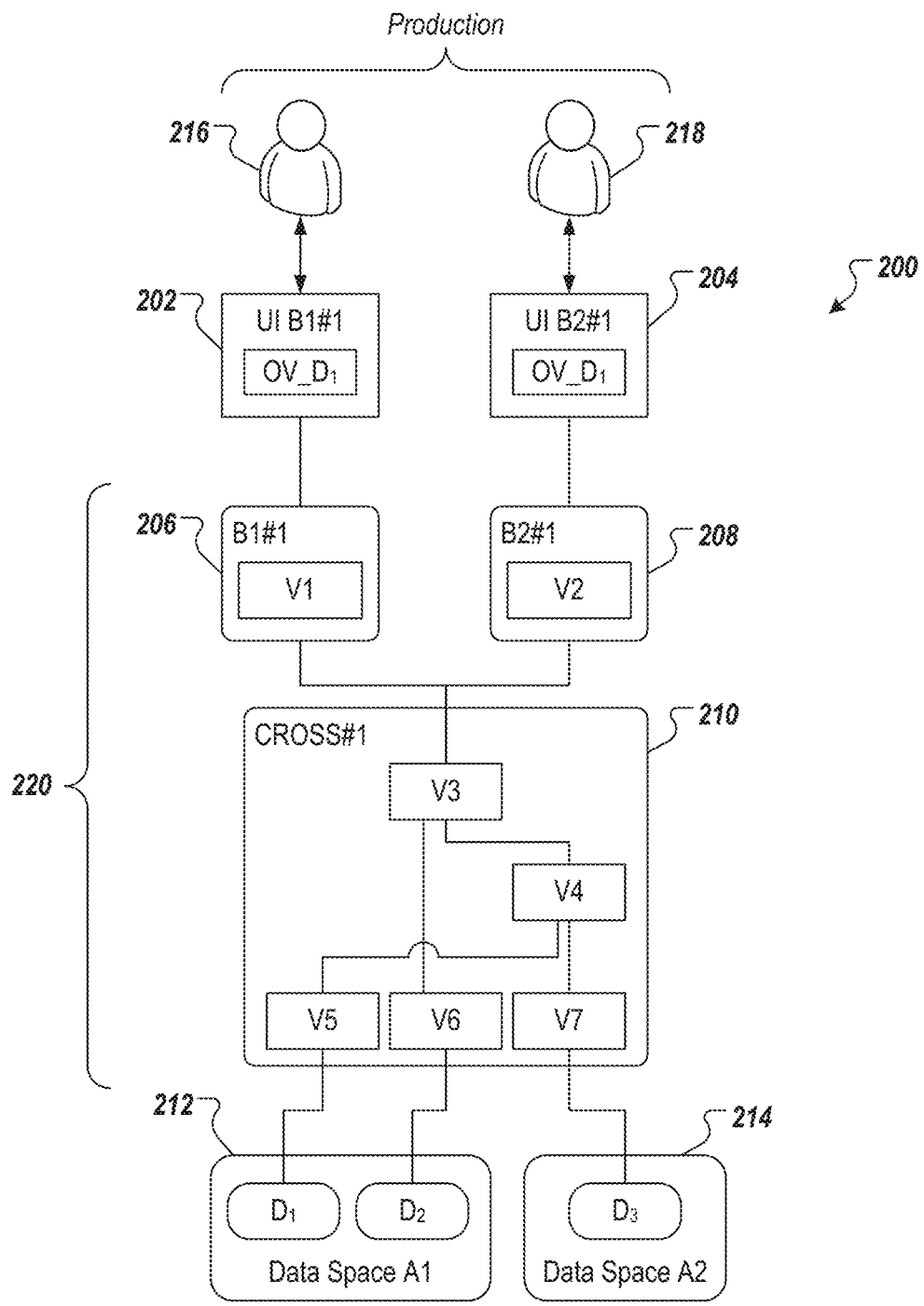
FIGS. 2A-2C schematically depict an example extension in accordance with implementations of the present disclosure.
Figure 2B:
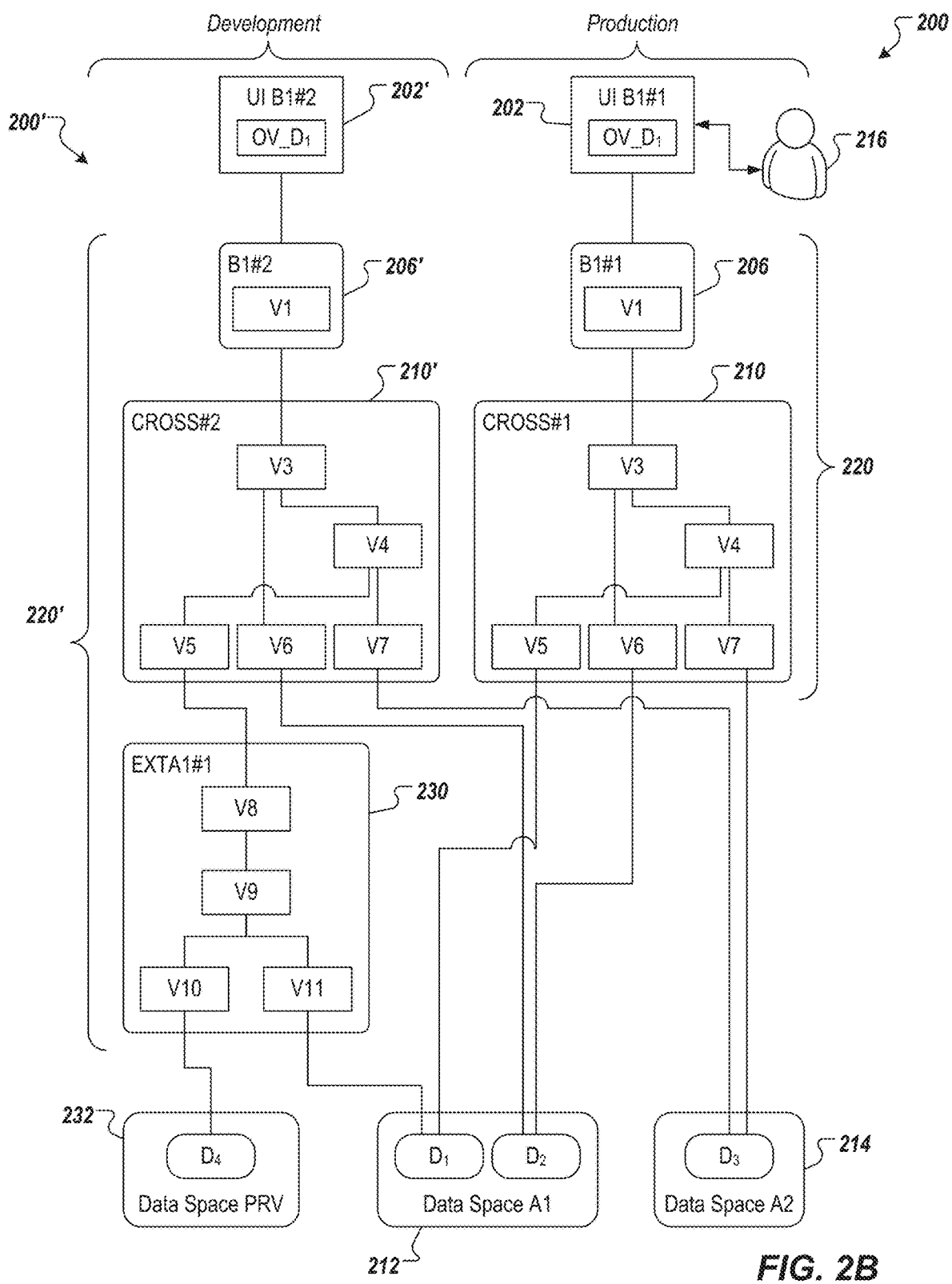
Figure 2C:
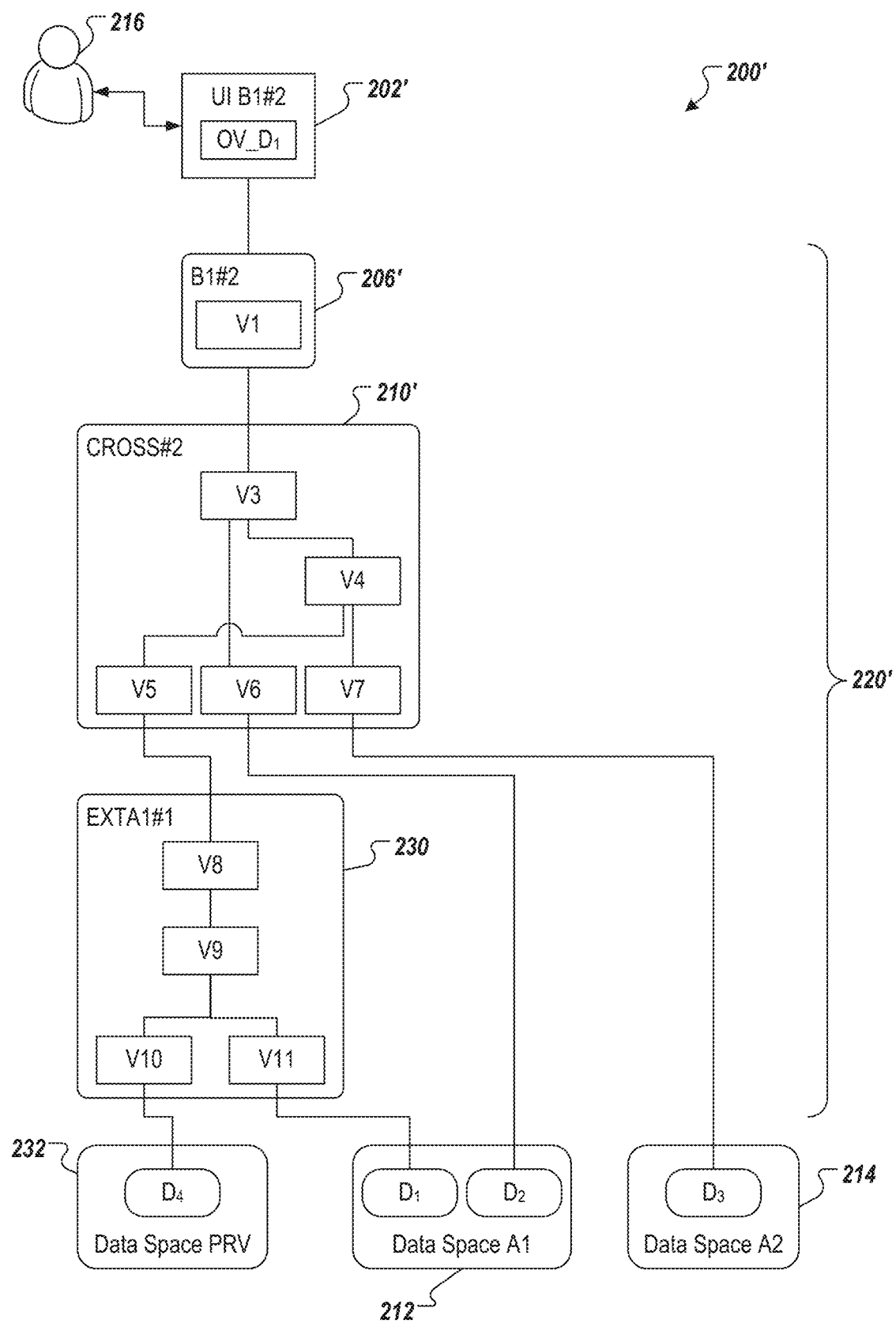

FIGS. 2A-2C schematically depict an application system 200 in accordance with implementations of the present disclosure. With particular reference to FIG. 2A, the application system 200 is represented in an as-provided state. That is, the state that the provider of the application system 200 makes the application system 200 available to customers prior to any customization. The application system 200 is described in further detail herein with reference to applications A1, A2, B1, B2. By way of non-limiting example, the application A1 can be provided as a purchasing system, the application A2 can be provided as a CRM system, the application B1 can be provided as a first version of an analytics application, and the application B2 can be provided as a second version of the analytics application.

In the example of FIG. 2A, the application system 200 includes a UI 202, a UI 204, an application B1 206, an application B2 208, a cross schema 210, a data space 212, and a data space 214. In some examples, the cross schema 210 can be described as a cross space that federates data of the applications A1, A2 to enable the applications B1, B2 206, 208 to receive federated data from the applications A1, A2. In the example of FIG. 2A, data in the data space 212 includes first data ($D_1$) and second data ($D_2$), and data in the data space 214 includes third data ($D_3$). For example, and without limitation, the first data can include vendor data and the second data can include purchase data replicated from the purchasing system and collectively representing purchases from respective vendors recorded within the purchasing system (the application A1). As another example, and without limitation, the third data can include contact data replicated from the CRM system and representing contacts recorded within the CRM system (the application A2).

In some examples, the UI 202 enables a customer user 216 of a first customer (e.g., a product vendor) to access data stored in each of the data spaces 212, 214 through the application B1, and the UI 204 enables a customer user 218 of a second customer (e.g., a product buyer) to access data stored in each of the data spaces 212, 214 through the application B2. For example, the customer user 216 can interact with an overview of the first data ($OV\_D_1$) through the UI 202, and the customer user 218 can interact with an overview of the first data ($OV\_D_1$) through the UI 204. In some examples, the application B1 206, the application B2 208, and the cross schema 210 are included in a schema stack 220. In this example, the data in the data spaces 212, 214 is public data.

In the example of FIG. 2A, the application B1 206 includes a view V1, the application B2 208 includes a view V2, and the cross schema 210 includes views V3, V4, V5, V6, V7. For example, the view V5 provides a view of at least a portion of $D_1$, the view V6 provides a view of at least a portion of $D_2$, and the view V7 provides a view of at least a portion of $D_3$. The view V4 performs a join operation to join data of $D_1$ provided through the view V5 and data of $D_3$ provided through the view V7. The view V3 performs a join operation to join at least a portion of $D_2$ provided through the view V6 and the view of data of $D_1$ and data of $D_3$ provided thought the view V4. The views V1, V2 provide respective views of data of $D_1$, data of $D_2$, and data of $D_3$ provided through the view V3.

In accordance with implementations of the present disclosure, synonyms are used to wire respective views based on dependency relationships in view of object import/export. As a non-limiting example, the application B1 206 can have a schema id of B1 #1, the application B2 208 can have a schema id of B2 #1, and the view schema 210 can have a schema id of CROSS #1. Accordingly, example synonyms can be provided as:

TABLE 3

Example Synonyms and Descriptions

| Synonym | Description |
| --- | --- |
| synonym B1#1.V3 for CROSS#1.V3 | Connect view V1 to view V3. |
| synonym B2#1.V3 for CROSS#1.V3 | Connect view V2 to view V3. |
| synonym CROSS#1.V5 for A1.TABD1 | Connect view V5 to table storing $D_1$. |
| synonym CROSS#1.V6 for A1.TABD2 | Connect view V6 to table storing $D_2$. |
| synonym CROSS#1.V7 for A2.TABD3 | Connect view V7 to table storing $D_3$. |

As introduced above, a customer can customize application systems, such as the application system 200. By way of non-limiting example, an example extension implemented by the first customer (i.e., the customer using the application B1) will be described in further detail herein with reference to FIGS. 2B and 2C.

With particular reference to FIG. 2B, a developer of the first customer can deploy a UI 202', a UI interface 206' (schema id B1 #2), and a cross schema 210' (schema id CROSS #2) in a development environment, which respectively correspond to the UI 202, the UI interface 206, and the cross schema 210. This can be performed in parallel with production use the UI 202, the UI interface 206, and the cross schema 210 in the production environment. In the example of FIG. 2B, the example extension is described as a customization of the first customer. Consequently, the UI 204 and the UI interface 208 are not depicted for purposes of clarity.

In the example of FIG. 2B, the developer provides an extension schema 230 (schema id EXTA1 #1) to provide an extended schema stack 220' in an extended application system 200'. In this example, the extension schema 230 enables a union operation to be executed on at least a portion of $D_1$ and at least a portion of fourth data ($D_4$) stored within a data space 232. In this example, the data space 232 is a private (PRV) data space (i.e., a tenant space that is only accessible to the first customer). For example, $D_4$ can be replicated to the data space 232 from a private database of the first customer. In the example of FIG. 2B, the extension schema includes a view V8, a view V10, and a view V11. In some examples, the view V10 provides a view of at least a portion of $D_4$ and the view V11 provides a view of at least a portion of $D_1$. The view V9 performs a union operation to provide union data of $D_4$ provided through the view V10 and data of $D_1$ provided through the view V11. The exporting view V8 is defined to read from V9. Here, the extension schema 230 overwrites the object imported by the view V5 from the data space 212 and replaces it with an object exported by the view V8.

In accordance with implementations of the present disclosure, the developer can test the extended application system with the extension schema 230 in the development environment and make changes, if any, as required. At some point, the developer can release the extended application system to the production environment. For example, upon deployment of the extended application system to the production environment, dependencies are checked and synonyms are generated to wire the import/export flow of the extended application. FIG. 2C depicts operation of the extended application system 200' in production. In some examples, and as discussed above, the application system 200 and the extended application system 200' can co-exist in production for a period of time. For example, queries being processed by the application system 200 prior to deployment of the extended application system 200' can continue to execute. After such queries have completed, any new queries are executed by the extended application system 200'. In some examples, after the application system 200 has executed any remaining queries, the UI 202, the UI interface 206, and the cross schema 210 can be un-deployed (dismantled).

Figure 3A:
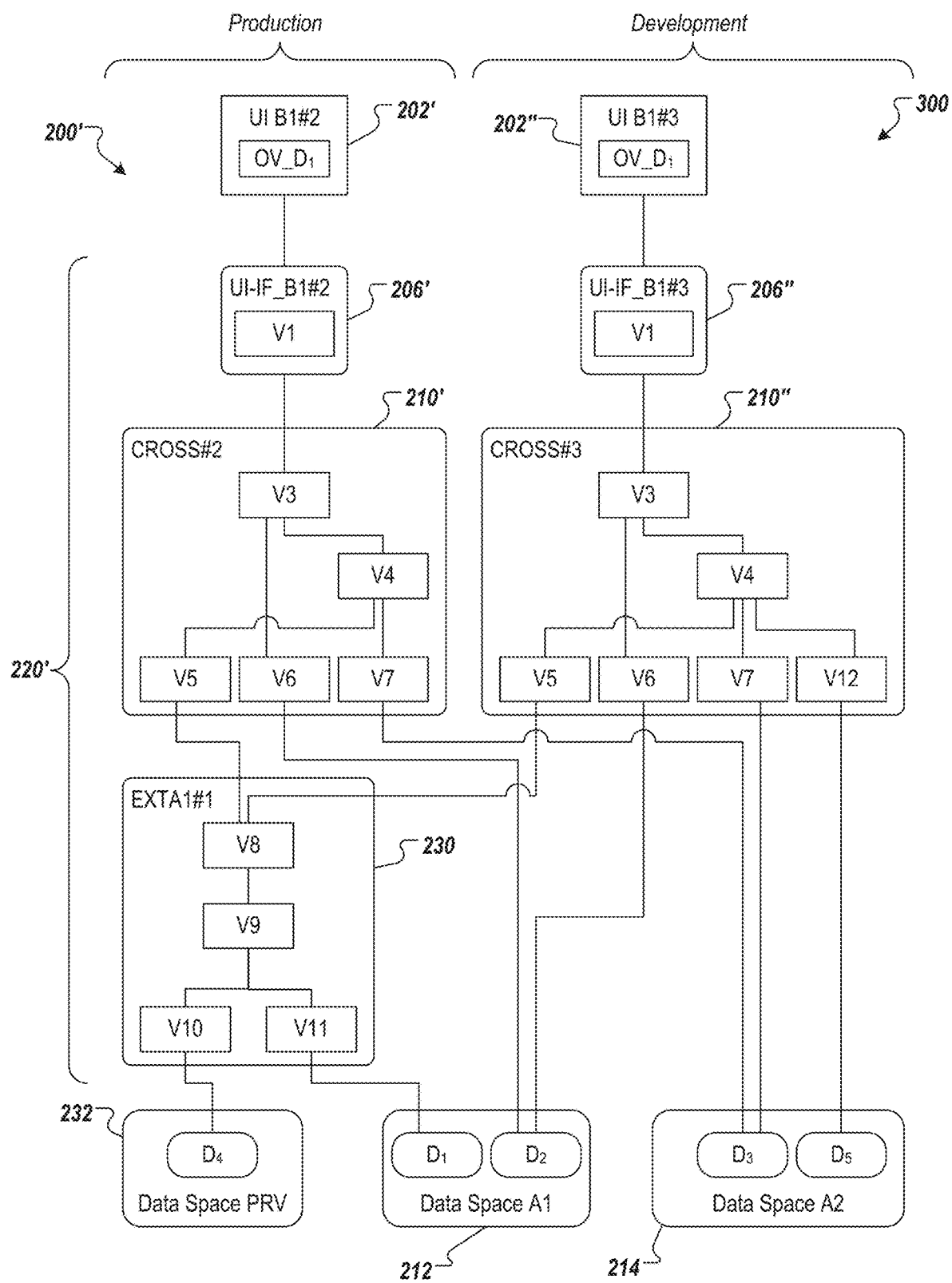
FIGS. 3A and 3B schematically depict an example upgrade in presence of an extension in accordance with implementations of the present disclosure.
Figure 3B:
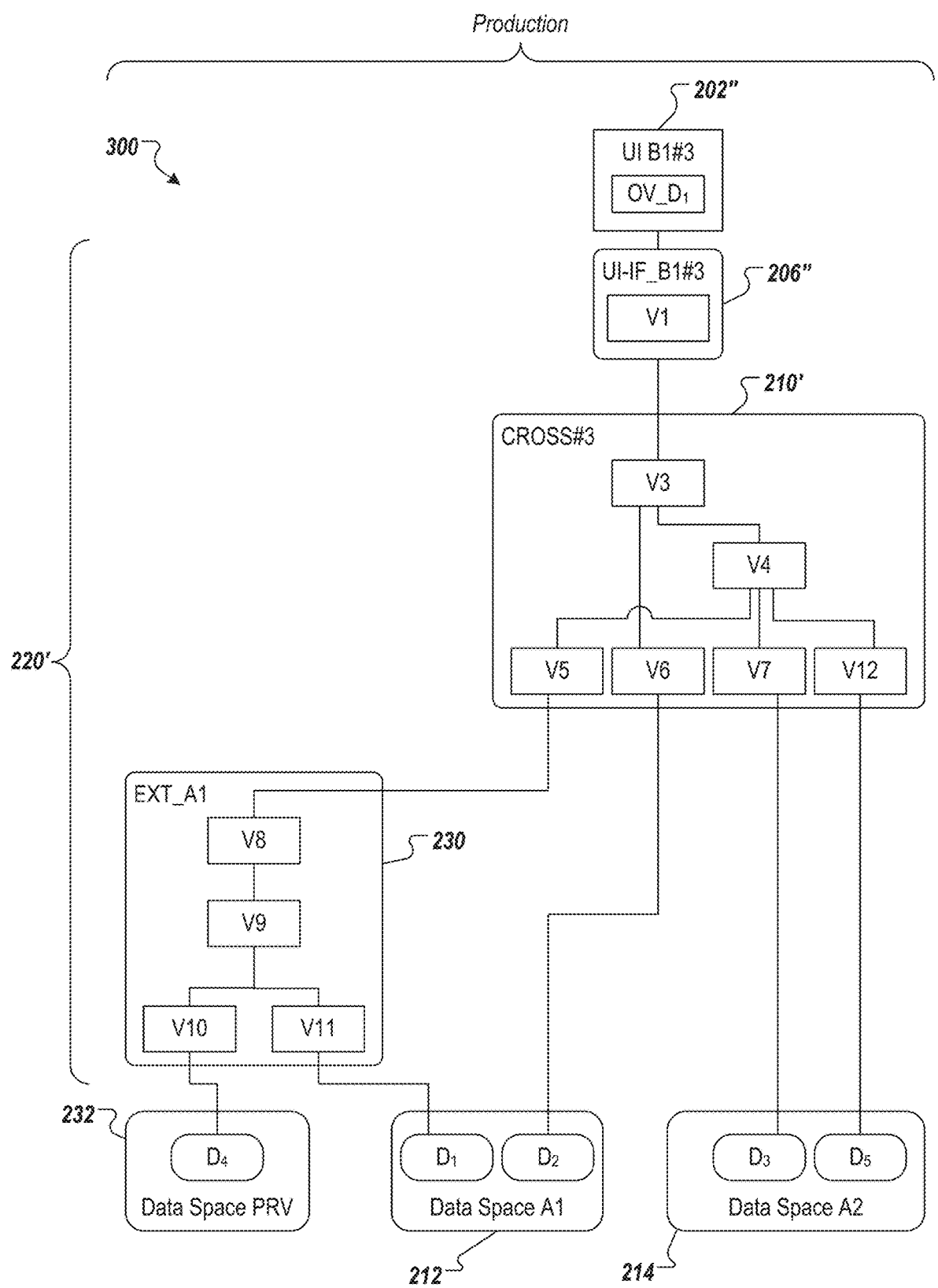

FIGS. 3A and 3B schematically depict an example upgrade in presence of an extension in accordance with implementations of the present disclosure. The example upgrade of FIGS. 3A and 3B includes an upgrade to the extended application system 200' of FIG. 2C, namely, adding a view for additional data that is to be joined in the cross schema 210' to provide a cross schema 210" (schema id CROSS #3) (e.g., new version of the cross schema 210') in an application system 300. Here, the application system 300 is upgraded and extended.

In the example of FIG. 3A, a view V12 is included in the cross schema 210" and provides a view of at least a portion of fifth data ($D_5$) and that is joined with other data in the view V4. As depicted in FIG. 3A, the software provider can deploy a UI 202", a UI interface 206" (schema id B1 #3), and a cross schema 210" (schema id CROSS #3) in a development environment, which respectively correspond to the UI 202', the UI interface 206', and the cross schema 210'. This can be performed in parallel with production use the UI 202', the UI interface 206', the cross schema 210', and the extension schema 230 (that is, the extended application 200') in the production environment.

After the upgrade is complete, the application system 300 can be deployed to the production environment. For example, upon deployment of the application system 300 to the production environment, dependencies are checked and synonyms are generated to wire the import/export flow of the application system 300. For example, the system can detect any extensions and generate appropriate synonyms. In the example of FIG. 3A, the system can detect the extension schema 230 (e.g., based on the schema id EXTA1 #1), and can create an appropriate synonym.

FIG. 3B depicts operation of the application system 300 in production. In some examples, and as discussed above, the application system 300 and the extended application system 200' can co-exist in production for a period of time. For example, queries being processed by the extended application system 200' prior to deployment of the application system 300 can continue to execute. After such queries have completed, any new queries are executed by the application system 300. In some examples, after the extended application system 200' has executed any remaining queries, the UI 202', the UI interface 206', and the cross schema 210' can be un-deployed (dismantled).

FIGS. 4A-4F schematically depicts an example upgrade in presence of an extension in accordance with implementations of the present disclosure.

Figure 4A:
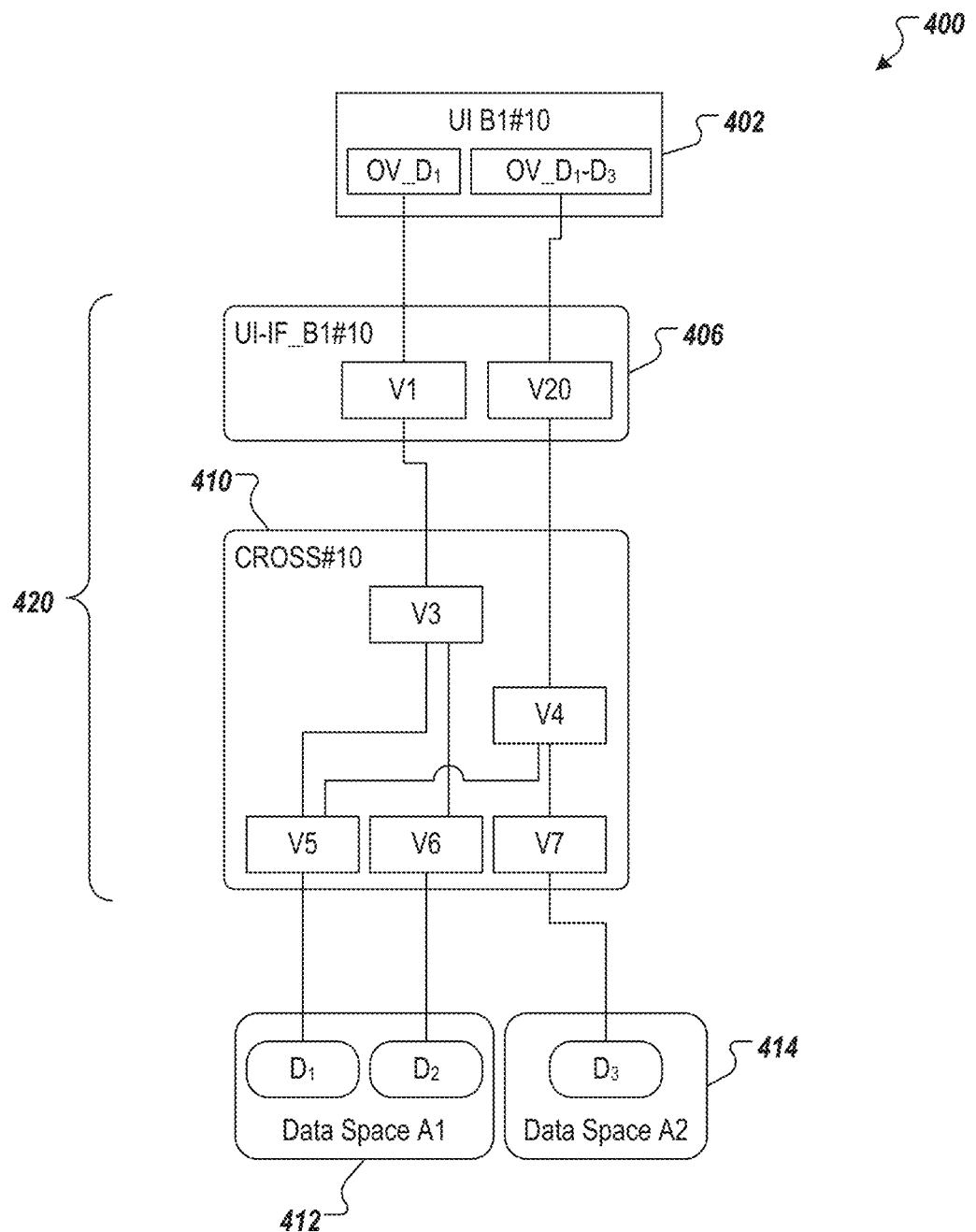
FIGS. 4A-4F schematically depicts an example upgrade in presence of an extension in accordance with implementations of the present disclosure.

With particular reference to FIG. 4A, an application system 400 is depicted. and is represented in an as-provided state. That is, the state that the provider of the application system 400 makes the application system 400 available to customers prior to any customization. The application system 400 is described in further detail herein with reference to applications A1, A2, B1, B2. By way of non-limiting example, the application A1 can be provided as a purchasing system, the application A2 can be provided as a CRM system, the application B1 can be provided as a first version of an analytics application, and the application B2 can be provided as a second version of the analytics application.

In the example of FIG. 4A, the application system 400 includes a UI 402, an application B1 406, a cross schema 410, a data space 412, and a data space 414. In some examples, the cross schema 410 can be described as a cross space that federates data of the applications A1, A2 to enable the application B1 406 to receive federated data from the applications A1, A2. In the example of FIG. 4A, data in the data space 412 includes first data ($D_1$) and second data ($D_2$), and data in the data space 414 includes third data ($D_3$). For example, and without limitation, the first data can include vendor data and the second data can include purchase data replicated from the purchasing system and collectively representing purchases from respective vendors recorded within the purchasing system (the application A1). As another example, and without limitation, the third data can include contact data replicated from the CRM system and representing contacts recorded within the CRM system (the application A2).

In some examples, the UI 402 enables a customer user of a customer to access data stored in each of the data spaces 412, 414 through the application B1. For example, the customer user can interact with an overview of the first data ($OV\_D_1$) through the UI 202, and the customer user 218 can interact with an overview of the first data ($OV\_D_1$) and/or an overview of the first data and third data ($OV\_D_1$-$D_3$) through the UI 402. In some examples, the application B1 406, and the cross schema 410 are included in a schema stack 420.

In the example of FIG. 4A, the application B1 406 includes a view V1 and a view V20, and the cross schema 410 includes views V3, V4, V5, V6, V7. For example, the view V5 provides a view of at least a portion of $D_1$, the view V6 provides a view of at least a portion of $D_2$, and the view V7 provides a view of at least a portion of $D_3$. The view V4 performs a join operation to join data of $D_1$ provided through the view V5 and data of $D_3$ provided through the view V7. The view V3 performs a join operation to join at least a portion of $D_1$ provided through the view V5 and at least a portion of $D_2$ provided through the view V6. The views V1, V20 provide respective views of data provided through the view V3 and the view V4, respectively.

Figure 4B:
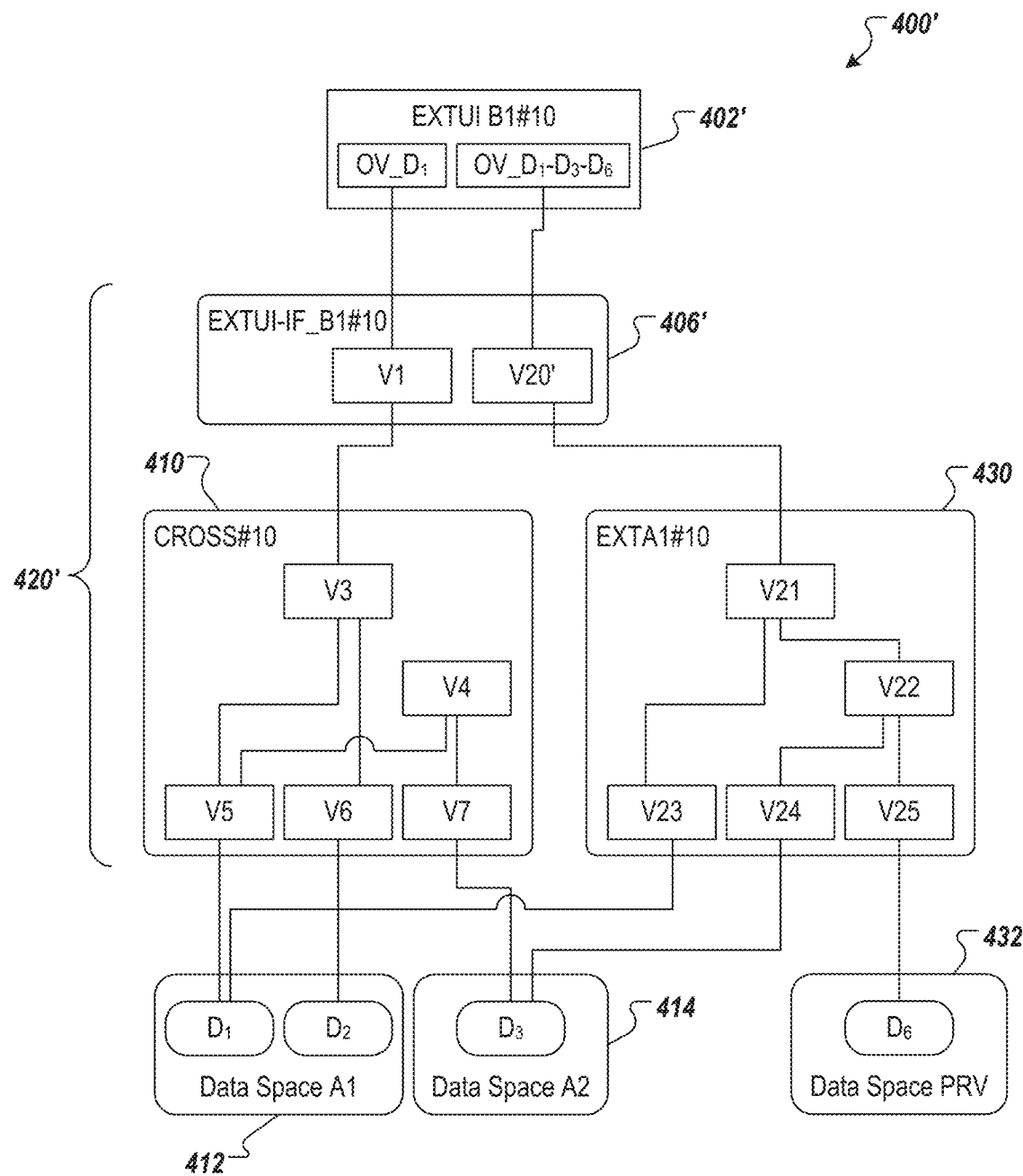

Referring now to FIG. 4B, an extension can be applied to the application system 400 of FIG. 4A to provide an extended application system 400'. In the example of FIG. 4B, the extended application system 400' is represented in production use after deployment from a development environment (e.g., as similarly described herein with reference to FIGS. 2A-2C). The extended application system 400' includes an extended UI 402', an extended application B1 406', the cross schema 410, and an extension schema 430. The extended application B1 406', the cross schema 410, and the extension schema 430 are included in a schema stack 420'. In some examples, the extension schema 430 is implemented by the first customer.

In the example of FIG. 4B, the extension schema 430 enables a join operation to be executed on at least a portion of $D_3$ and at least a portion of sixth data ($D_6$) stored within a data space 432. In this example, the data space 432 is a private (PRV) data space (i.e., a tenant space that is only accessible to the first customer). For example, $D_6$ can be replicated to the data space 432 from a private database of the first customer. In the example of FIG. 4B, the extension schema 430 includes views V21, V22, V23, V24, V25. In some examples, the view V23 provides a view of at least a portion of $D_1$, the view V24 provides a view of at least a portion of $D_3$, and the view V25 provides a view of at least a portion of $D_6$. The view V22 performs a join operation to provide join data of $D_3$ provided through the view V24 and data of $D_6$ provided through the view V25. The view V21 performs a join operation to provide join data of $D_1$ provided through the view V23 and data of $D_3$ and $D_6$ provided through the view V22.

In the example of FIG. 4B, the extended application 406' is modified, relative to the application 406 of FIG. 4A, to modify the view V20 as an extended view V20'. For example, the view V20' can include fields to provided data of $D_6$. In this example, the view 20' imports objects of the view V21, instead of the view V4. That is, prior to the extensions, the view V4 exported objects to the view V20. The extended UI 402' has been modified, relative to the UI 402 of FIG. 4A, to provide an overview of the first data, the third data, and the sixth data (OV_$D_1$-$D_3$-$D_6$).

The software provider can provide an upgrade to the cross schema 410. At some point, the upgrade is pushed to tenants within the database system to implement the upgraded cross schema for production use. In this example, the schema stack management system of the present disclosure can identify any collisions between the extension schemas and upgrades pushed by the software provider.

Figure 4C:
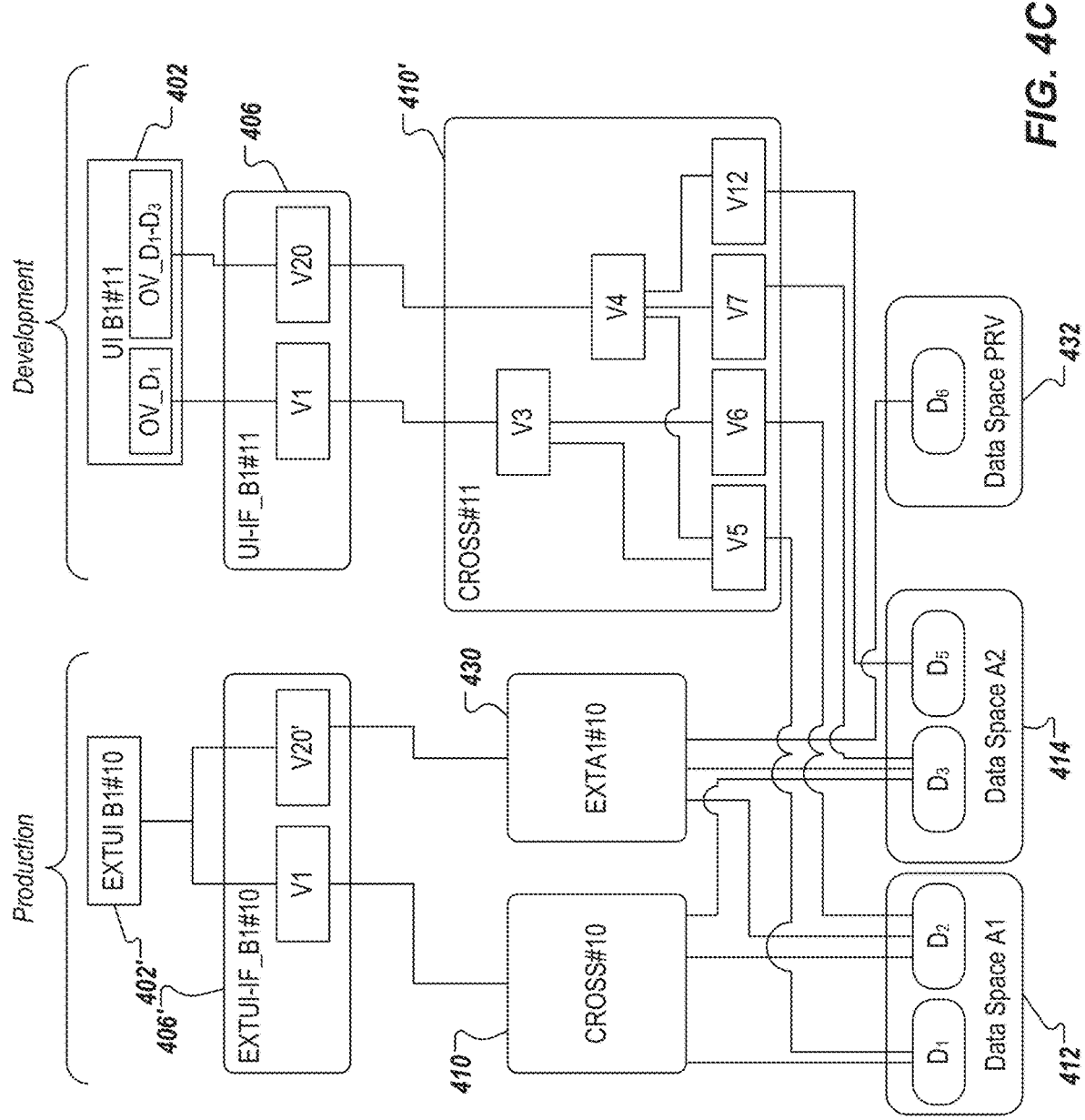

For example, and with reference to FIG. 4C, the software provider can push a cross schema 410' to tenants. In this example, the cross schema 410' can be a new version of the cross schema 410. In the example of FIG. 4C, the cross schema 410' includes a view V12, which provides a view on fifth data ($D_5$) in the data space 414, and the view V4 joins data of $D_5$ with data of $D_1$ and data of $D_3$. The schema stack management system of the present disclosure can determine that there is a collision between the cross schema 410' and the extension 430. In response, and as depicted in FIG. 4C, the schema stack management system provides a preview of an upgrade-intended schema stack within a development environment for a developer of the first customer to review. In the example of FIG. 4C, the upgrade-intended schema stack includes the UI 402, the application 406, the cross schema 410', and the extension 430.

Figure 4D:
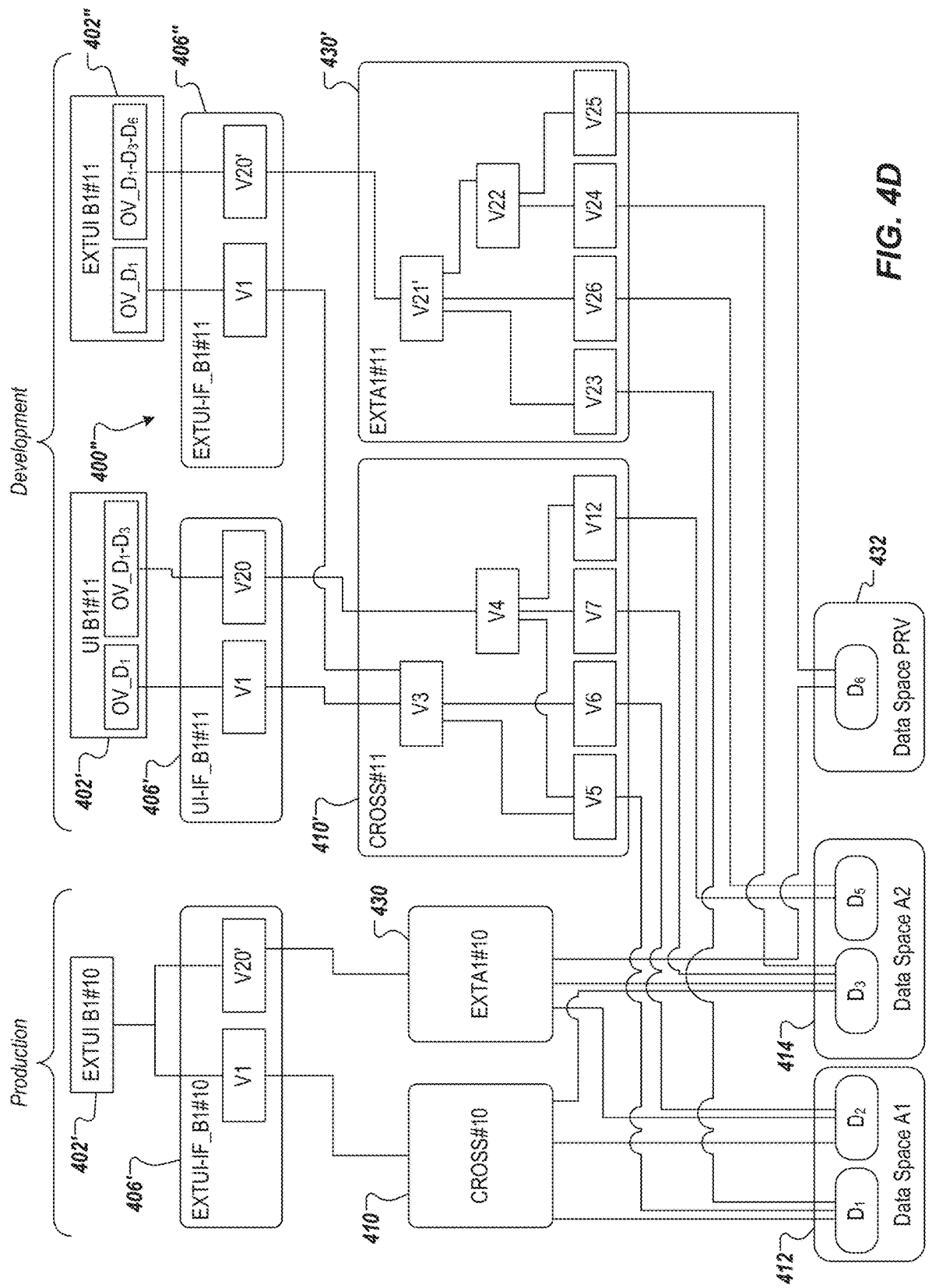

Referring now to FIG. 4D, to resolve the collision, the developer can open a space within the development environment to make modifications to the schema stack. As described herein, the modifications are made by the developer without access to any of the code underlying the cross schema 410' provided by the software provider. In this manner, implementations of the present disclosure can be considered "IP safe."

In the example of FIG. 4D, an extended UI 402" and an extended application B1 406" are provided, which correspond to the extended UI 402' and the extended application B1 406' provided with the extension schema 430. Also in the example of FIG. 4D, an extension schema 430' can be provided, which can be described as a new version of the extension schema 430. The extension schema 430' includes a view V26 that provides a view on data of $D_5$. The extension schema 430' also includes a view V21' that performs a join operation to join data of $D_1$ provided through the view V23, data of $D_5$ provided through the view 26, and data of $D_3$ and $D_6$ provided through the view V22.

Figure 4E:
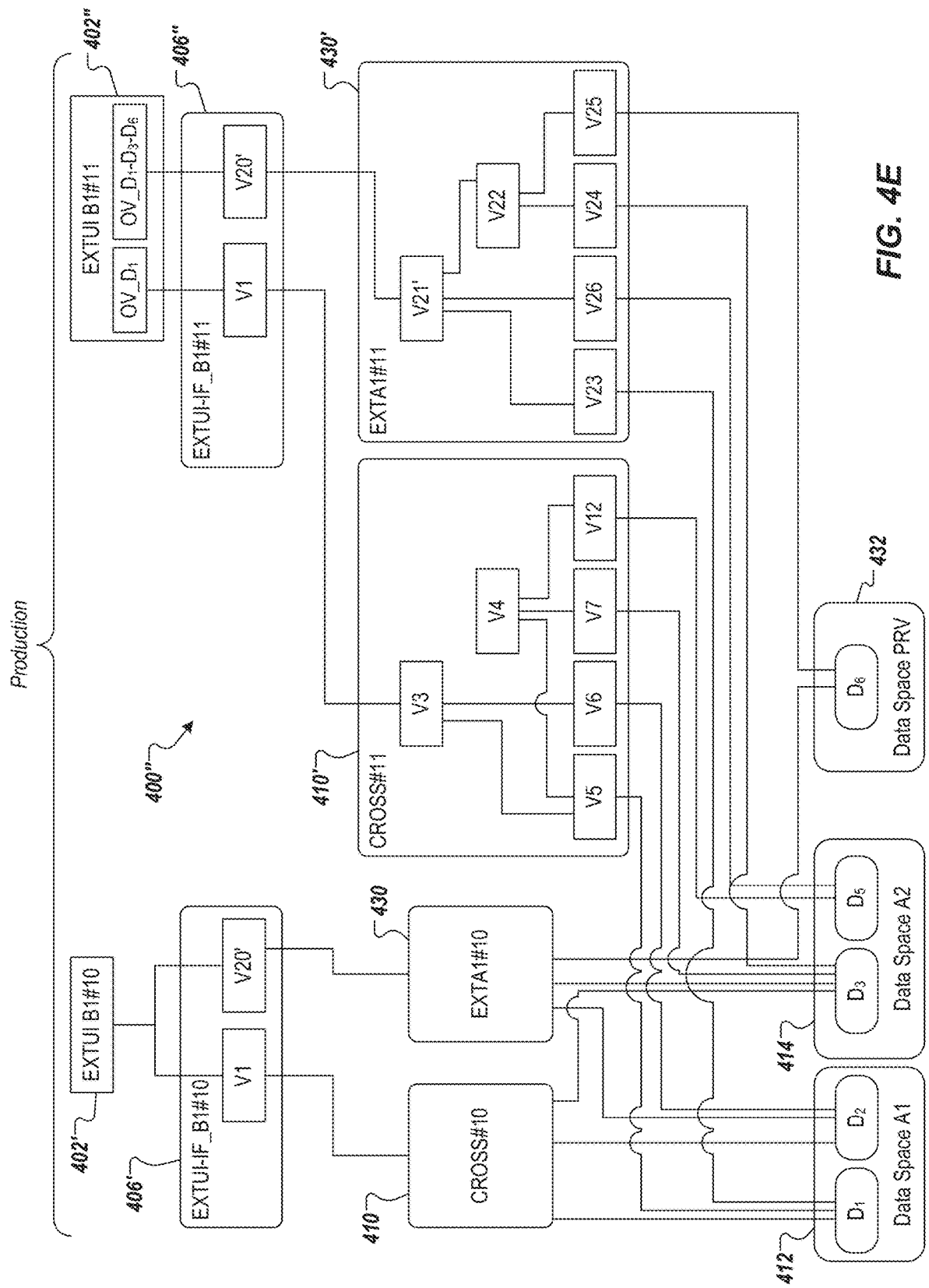
Figure 4F:
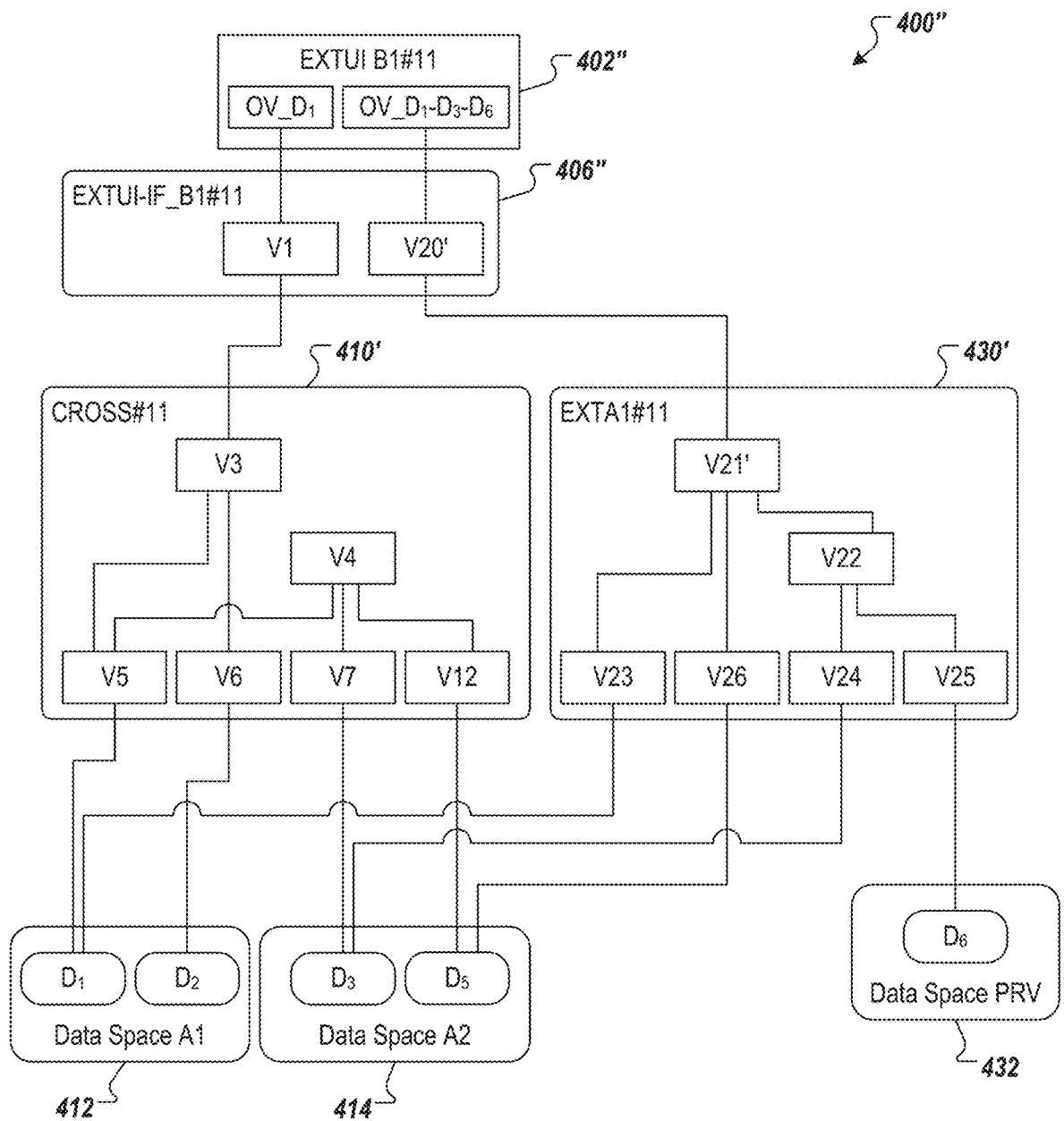

After development is complete, an application system 400" is provided, which can be described as an extended and upgraded version of the application system 400. The application system 400" can be deployed for production use. In some examples, the production system 400" is deployed in stages. For example, in a first stage, users can be switched to the extended UI 402" and the UI 402 and the application B1 406 can be removed, as represented in FIG. 4E. In a second stage, the cross schema 410 and the extension 430 can be undeployed, as represented in FIG. 4F.

In some implementations of the present disclosure provide a design-time repository (e.g., accessible through the development environment) that stores extensions. As described herein, the extensions can each provide similar information as applications (used app-space-name with minimum version, exported objects). Further, the development environment includes extension design-time artifacts that enable a deploy tool to create the space and the objects within the space (e.g. there are view-create-statements in the design-time).

In some examples, and as described herein, the schema stack management system provides unique schema ids. For example, this can be achieved with schema ids composed of the app-space-name and an appended increasing number, the deployment instance number (e.g. "A1" and "3" combined to "A1 #3" with some characters to separate name and number). If an application is deployed already with a deploy instance number n, the new deployment will go to n+1 (e.g., "A1 #4").

In some implementations, when extensions are deployed to the production environment, synonyms based on dependencies are created by the schema stack management system. In some examples, the schema stack management system determines a mapping "app (version)—schema id," where each schema id is unique. In some examples, if an application is to be deployed to a new schema id, the application is deployed with a new version, or the application is needed as it consumes application, which are deployed to a new schema id.

In some implementations, the schema stack management system determines the synonyms (wiring) for imported objects to the correct deployment instance of the exported object. For a deployed application, the importing statements are read and the providing (exporting) application and object are determined. The schema-id of the providing application is read from the registry. For the consuming (importing) application, a synonym is created for the object in the schema id of the providing application.

In some implementations, the schema stack management system performs consistency checks. In some examples, consistency checks ensure that an application only imports objects that are exported by another application.

In some implementations, the schema stack management system determines spaces to be deployed, even if the respective are not changed, to provide for a "blue-green" deployment. This enables the parallel (concurrent) use of the previous version and the new version and a smooth transition of users from the previous version to the new version during production use without downtime. In some implementations, the schema stack management system determines spaces to be deployed, even if the respective applications are not changed, to provide an "extension environment" (development environment) for a developer (e.g., within a database system). This enables the parallel use of the previous version by users in a production environment and the to-be-developed version by the developer in the development environment. In some implementations, the schema stack management system determines space-wiring for extensions, overriding a wiring of the standard product by layering an extension between two standard components. In some examples, synonyms are created for the imported object to the extension object in the correct deployment instance of the extension, instead of to the standard exporting application deployment instance.

In some implementations, the schema stack management system detects collisions between an extension of a pre-upgrade UI and changes to the pre-upgrade UI resulting from a new version of the standard. This can occur, for example, if the UI has been extended (i.e., fields added) and/or if the interface has been defined as "overriding" (i.e., no fields are added). In both cases, a modification of the UI by the software provider might have to be reflected in the extension. In such cases, the UI is extended and the UI signature is modified by the software provider. In some examples, the signature is changed (i.e., new field or change types (mainly longer types)).

In some implementations, the schema stack management system modifies the dependency graph of applications when extensions are added. For example, extensions can specify dependency on applications and override certain objects. If a dependency graph of applications is computed and an application is found, which is extended in a way that one of their interface objects is overridden by an extension, the extension is entered into the dependency graph (for the overridden objects) as a consumer of the application it extends and as a provider for the applications consuming the original objects.

Implementations of the present disclosure also provide a set of registries. In some examples, a registry can store dependencies between application versions and required other application version (e.g., <consuming app-space-name>, <consuming app version>, <providing app-space-name>, <minimum providing app version>). In some examples, a registry can store dependencies of extension versions to the application version being extended (e.g., <extension name>, <extension version>, <providing app-space-name>, <minimum providing app version>). In some examples, a registry can store "override" information of an object in one application version being replaced by an object in an extension version (e.g., <consuming app-space-name>, <object-name> overriding <providing app-space-name>, <object-name>; <consuming app-space-name>, <object-name> extending <providing app-space-name>, <object-name>). In some examples, a registry can store dependencies of applications consuming an extension instead of the original application being extended (e.g., <consuming app-space-name>, <minimum consuming app version>, <extension name>, <extension version>). In some examples, a registry can store the mapping "app-space-name, version—schema id."

Figure 5:
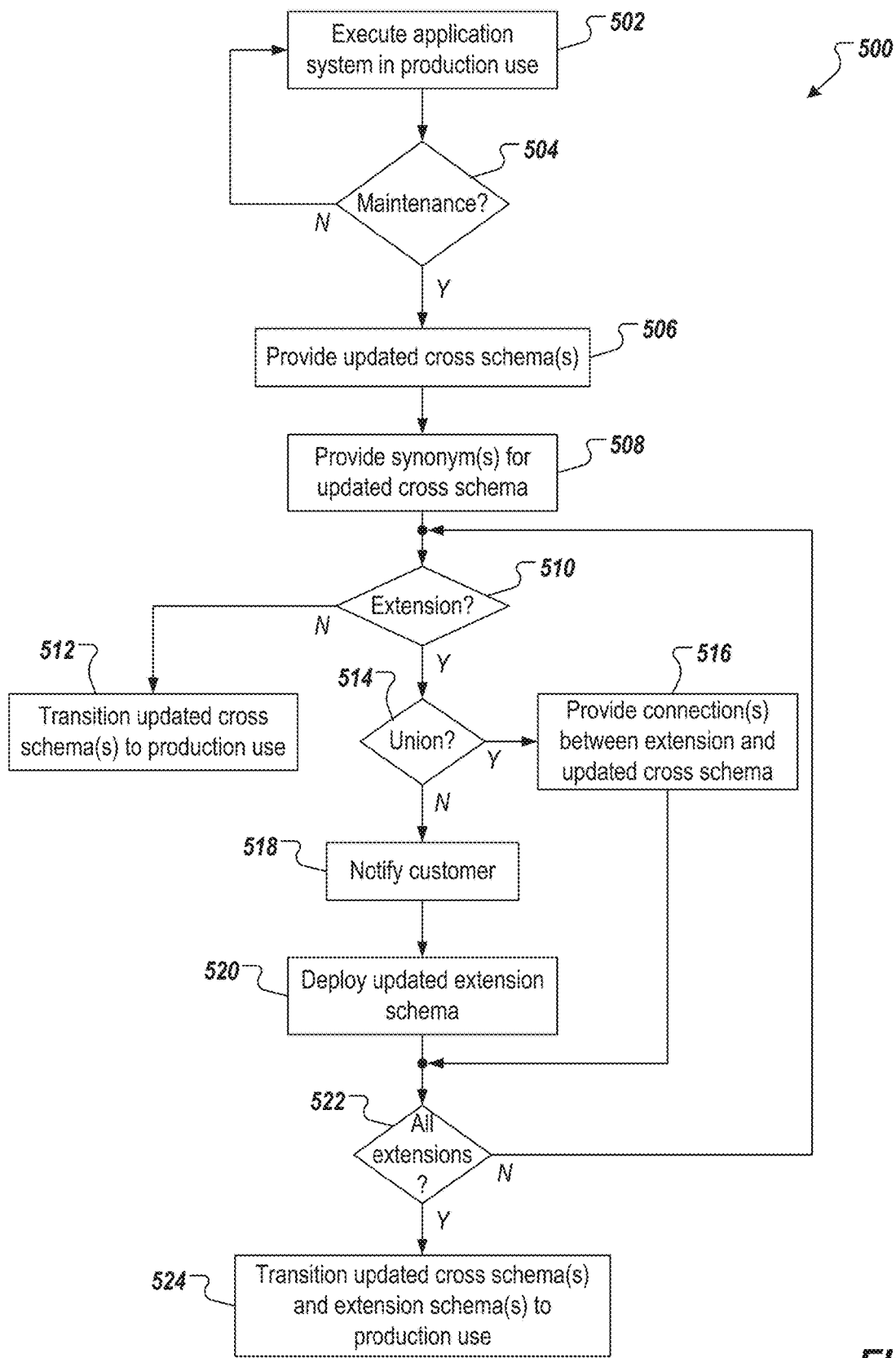
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices (e.g., the server system 108 of FIG. 1).

An application system is executed in production use (502). For example, and as described herein, an application system can be provided for production use and can include a schema stack having one or more cross schemas. In some examples, the schema stack of the application system can include one or more extension schemas (see, e.g., FIGS. 2A, 2C and 4B). In some examples, production use can include one or more users interacting with the applications system to access data in one or more data spaces (e.g., within a database system).

It is determined whether a maintenance procedure is to be executed on the application system (504). For example, and as described herein, it can be determined what a cross schema of the schema stack is to be updated from a first version to a second version. If a maintenance procedure is not to be executed, the example process 500 loops back. If a maintenance procedure is to be executed, one or more updated cross schemas are provided (506) and one or more synonyms are provided for each updated cross schema (508). For example, and as described herein with reference to FIG. 3A, the cross schema 210" can be provided as an updated version of the cross schema 210', and synonyms are provided to connect the views V5, V6, V7, and V12 to the extension schema 210, the second data $D_2$, the third data $D_3$, and the fifth data $D_5$, respectively. As another example, and as described herein with reference to FIG. 4C, the cross schema 410' can be provided as an updated version of the cross schema 410, and synonyms are provided to connect the views V5, V6, V7, and V12 to the first data $D_1$, the second data $D_2$, the third data $D_3$, and the fifth data $D_5$, respectively.

It is determined whether the application system includes one or more extension(s) (510). For example, and as described herein, a dependency registry can be read, which indicates whether the application system includes one or more extensions in the schema stack. If the application system does not include one or more extensions, the maintenance procedure completes and the one or more updated cross-schema(s) are transitioned for production use (512). For example, and as described herein, queries being processed by the application system prior to completion of the maintenance procedure can continue to execute. After such queries have completed, any new queries are executed by the application system using the updated cross schema(s).

If the application system does include one or more extensions, each extension is evaluated. For example, it is determined whether an extension is a union-type extension (514). If the extension is a union-type extension, one or more connections are provided between the extension and at least one of the one or more updated cross schemas (516). For example, and as described herein with reference to FIG. 3A, a synonym is provided to connect the view V8 of the extension 230 to the view V5 of the cross schema 210". If the extension is not a union-type extension (e.g., the extension is a join-type), a customer is notified (518) and an updated extension schema is deployed (520). For example, and as described herein, with reference to FIG. 4D, the customer that developed the extension 430 can be notified that the cross schema 410 is being updated to the cross-schema 410' and the customer can provide the extension schema 430' as an updated version of the extension schema 430.

It is determined whether all extensions of the application system have been addressed (522). If all extensions have not been addressed, the example process 500 loops back. If all extensions have been addressed, the one or more updated cross schema(s) and the one or more extension schema(s) are transitioned for production use. For example, and as described herein with reference to FIG. 3B, the application system 300 and the extended application system 200' can co-exist in production for a period of time. For example, queries being processed by the extended application system 200' prior to deployment of the application system 300 can continue to execute. After such queries have completed, any new queries are executed by the application system 300. In some examples, after the extended application system 200' has executed any remaining queries, the UI 202', the UI interface 206', and the cross schema 210' can be un-deployed (dismantled). As another example, and as discussed herein with reference to FIGS. 4E and 4F, the application system 400" can be deployed for production use in stages. For example, in a first stage, users can be switched to the extended UI 402" and the UI 402 and the application B1 406 can be removed (FIG. 4E), and, in a second stage, the cross schema 410 and the extension 430 can be undeployed (FIG. 4F).

Figure 6:
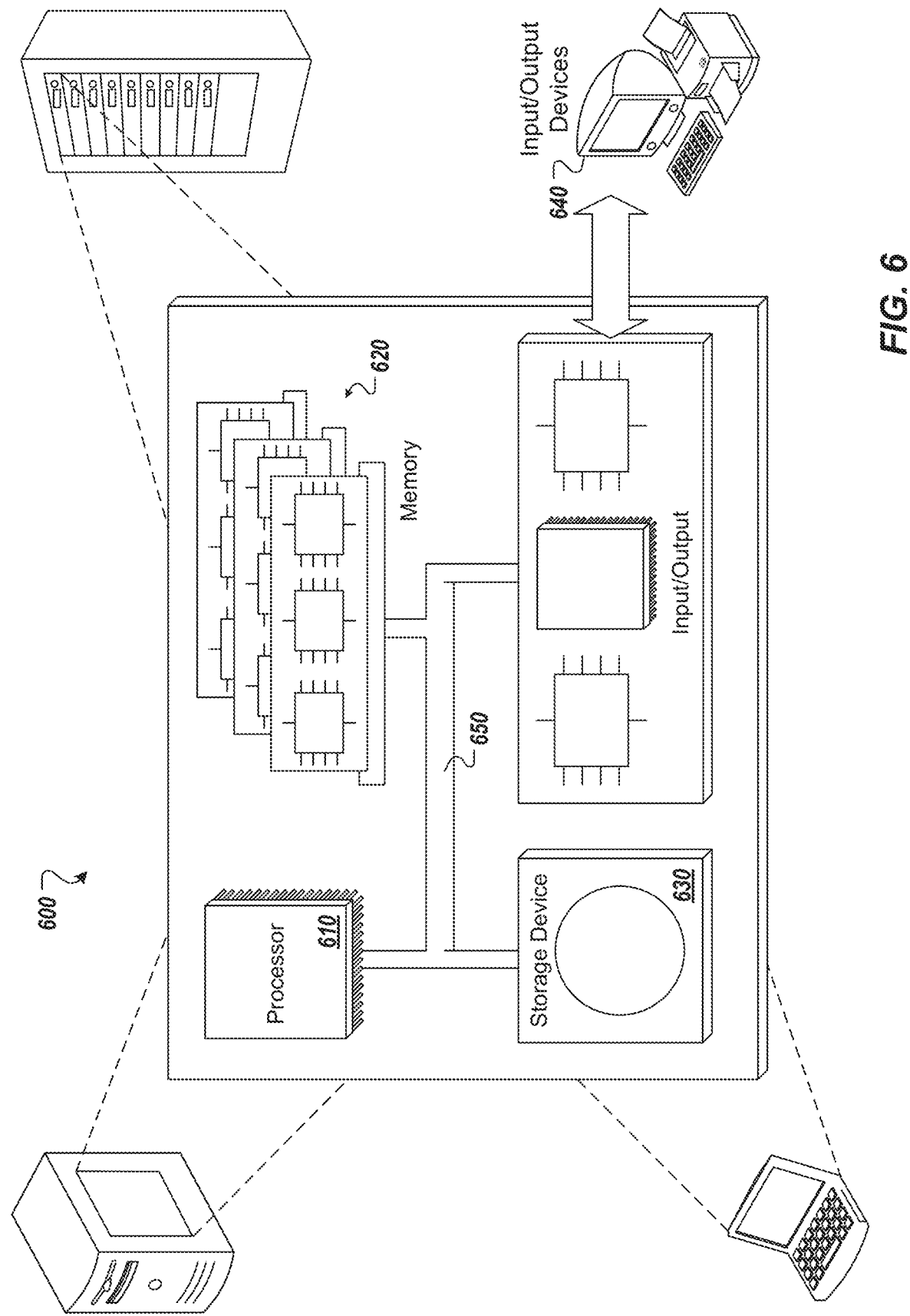
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for executing maintenance procedures on application systems that include one or more extensions, the method being executed by one or more processors and comprising:
   providing, for production use, an application system comprising a schema stack comprising a first cross schema and one or more extension schemas, the first cross schema providing federated data to a first set of applications from data of respective data spaces of a second set of applications;
   initiating a maintenance procedure to the application system;
   during the maintenance procedure:
       maintaining a first set of synonyms between the first cross schema and one or more of the respective data spaces having data stored therein to enable continued production use of the schema stack while the maintenance procedure executes, each synonym connecting a view of the first cross schema to one of a view of an application in the first set of applications and a table in a data space of an application in the second set of applications, deploying a second cross schema in the schema stack, the second cross schema being a different version than the first cross schema, providing a second set of synonyms between the second cross schema and the one or more data spaces to enable non-production use of the second cross schema while the maintenance procedure executes, and in response to determining that the schema stack comprises one or more extension schemas executing one or more of providing at least one connection between a first extension schema and the second cross schema, and deploying a second extension schema; and after completion of the maintenance procedure:
selectively transitioning the first cross schema from production use to non-production use and the second cross schema from non-production use to production use for one or more users.

2. The method of claim 1, wherein the first extension schema is included in the schema stack prior to execution of the maintenance procedure and is available for production use through the first cross schema for production use while the maintenance procedure executes, the at least one connection between the first extension schema and the second cross schema being provided for non-production use while the maintenance procedure executes.

3. The method of claim 2, wherein selectively transitioning the second cross schema from non-production use to production use at least partially comprises enabling the at least one connection between the first extension schema and the second cross schema for production use.

4. The method of claim 1, wherein the second extension schema is a different version of the first extension schema and replaces the first extension schema for production use upon transitioning the second cross schema from non-production use to production use.

5. The method of claim 4, wherein the first extension schema is created and deployed by a consumer of the application system, and in response to execution of the maintenance procedure, the consumer is alerted and provides the second extension schema to replace the first extension schema for production use.

6. The method of claim 1, wherein selectively transitioning the first cross schema from production use to non-production use and the second cross schema from non-production use to production use for one or more users at least partially comprises transitioning at least one user from a first user interface to a second user interface.

7. The method of claim 1, wherein the maintenance procedure is executed by a vendor of the application system.

8. A non-transitory computer-readable storage medium coupled to one or more processors and having instructions stored thereon which, when executed by the one or more processors, cause the one or more processors to perform operations for executing maintenance procedures on application systems that include one or more extensions, the operations comprising:

providing, for production use, an application system comprising a schema stack comprising a first cross schema and one or more extension schemas, the first cross schema providing federated data to a first set of applications from data of respective data spaces of a second set of applications;

initiating a maintenance procedure to the application system;

during the maintenance procedure:
maintaining a first set of synonyms between the first cross schema and one or more of the respective data spaces having data stored therein to enable continued production use of the schema stack while the maintenance procedure executes, each synonym connecting a view of the first cross schema to one of a view of an application in the first set of applications and a table in a data space of an application in the second set of applications, deploying a second cross schema in the schema stack, the second cross schema being a different version than the first cross schema, providing a second set of synonyms between the second cross schema and the one or more data spaces to enable non-production use of the second cross schema while the maintenance procedure executes, and in response to determining that the schema stack comprises one or more extension schemas executing one or more of providing at least one connection between a first extension schema and the second cross schema, and deploying a second extension schema; and after completion of the maintenance procedure:
selectively transitioning the first cross schema from production use to non-production use and the second cross schema from non-production use to production use for one or more users.

9. The non-transitory computer-readable storage medium of claim 8, wherein the first extension schema is included in the schema stack prior to execution of the maintenance procedure and is available for production use through the first cross schema for production use while the maintenance procedure executes, the at least one connection between the first extension schema and the second cross schema being provided for non-production use while the maintenance procedure executes.

10. The non-transitory computer-readable storage medium of claim 9, wherein selectively transitioning the second cross schema from non-production use to production use at least partially comprises enabling the at least one connection between the first extension schema and the second cross schema for production use.

11. The non-transitory computer-readable storage medium of claim 8, wherein the second extension schema is a different version of the first extension schema and replaces the first extension schema for production use upon transitioning the second cross schema from non-production use to production use.

12. The non-transitory computer-readable storage medium of claim 11, wherein the first extension schema is created and deployed by a consumer of the application system, and in response to execution of the maintenance procedure, the consumer is alerted and provides the second extension schema to replace the first extension schema for production use.

13. The non-transitory computer-readable storage medium of claim 8, wherein selectively transitioning the first cross schema from production use to non-production use and the second cross schema from non-production use to production use for one or more users at least partially comprises transitioning at least one user from a first user interface to a second user interface.

14. The non-transitory computer-readable storage medium of claim 8, wherein the maintenance procedure is executed by a vendor of the application system.

15. A system, comprising:
a computing device; and
a computer-readable storage device coupled to the computing device and having instructions stored thereon which, when executed by the computing device, cause the computing device to perform operations for executing maintenance procedures on application systems that include one or more extensions, the operations comprising:
providing, or production use, an application system comprising a schema stack comprising a first cross schema and one or more extension schemas, the first cross schema providing federated data to a first set of applications from data of respective data spaces of a second set of applications;
initiating a maintenance procedure to the application system;
during the maintenance procedure:
maintaining a first set of synonyms between the first cross schema and one or more of the respective data spaces having data stored therein to enable continued production use of the schema stack while the maintenance procedure executes, each synonym connecting a view of the first cross schema to one of a view of an application in the first set of applications and a table in a data space of an application in the second set of applications,
deploying a second cross schema in the schema stack, the second cross schema being a different version than the first cross schema,
providing a second set of synonyms between the second cross schema and the one or more data spaces to enable non-production use of the second cross schema while the maintenance procedure executes, and
in response to determining that the schema stack comprises one or more extension schemas executing one or more of providing at least one connection between a first extension schema and the second cross schema, and deploying a second extension schema; and
after completion of the maintenance procedure:
selectively transitioning the first cross schema from production use to non-production use and the second cross schema from non-production use to production use for one or more users.

16. The system of claim 15, wherein the first extension schema is included in the schema stack prior to execution of the maintenance procedure and is available for production use through the first cross schema for production use while the maintenance procedure executes, the at least one connection between the first extension schema and the second cross schema being provided for non-production use while the maintenance procedure executes.

17. The system of claim 16, wherein selectively transitioning the second cross schema from non-production use to production use at least partially comprises enabling the at least one connection between the first extension schema and the second cross schema for production use.

18. The system of claim 15, wherein the second extension schema is a different version of the first extension schema and replaces the first extension schema for production use upon transitioning the second cross schema from non-production use to production use.

19. The system of claim 18, wherein the first extension schema is created and deployed by a consumer of the application system, and in response to execution of the maintenance procedure, the consumer is alerted and provides the second extension schema to replace the first extension schema for production use.

20. The system of claim 15, wherein selectively transitioning the first cross schema from production use to non-production use and the second cross schema from non-production use to production use for one or more users at least partially comprises transitioning at least one user from a first user interface to a second user interface.

* * * * *